United States Patent [19]
Nichols

[11] 3,959,138
[45] May 25, 1976

[54] WASHING MACHINE DRAIN FILTER

[76] Inventor: Louis B. Nichols, 1213 Hillshire Road, Baltimore, Md. 21222

[22] Filed: Nov. 7, 1974

[21] Appl. No.: 521,836

[52] U.S. Cl. .................................. 210/94; 210/460
[51] Int. Cl.² .......................................... B01D 35/00
[58] Field of Search ............... 210/94, 95, 239, 240, 210/446, 448, 449, 459, 460, 461, 462, 463, 473, 483, 484, 485

[56] References Cited
UNITED STATES PATENTS

| | | | |
|---|---|---|---|
| 1,137,480 | 4/1915 | Gwynn | 210/473 |
| 1,218,975 | 3/1917 | Brisan | 210/462 |
| 2,704,544 | 3/1955 | Ryan | 210/94 |
| 3,317,043 | 5/1967 | Vanderprel | 210/94 |
| 3,419,151 | 12/1968 | Smith et al. | 210/460 |
| 3,487,944 | 1/1970 | Tucker | 210/463 |
| 3,638,799 | 2/1972 | Serowlecki | 210/462 |
| 3,701,433 | 10/1972 | Krakauer | 210/446 |
| 3,804,258 | 4/1974 | Okuniewski | 210/460 |

*Primary Examiner*—Theodore A. Granger
*Attorney, Agent, or Firm*—John F. McClellan, Sr.

[57] ABSTRACT

A washing machine drain filter including a cage with a top having a drain tube connection and bore through the top, a bottom, an oversize filter bag inside the cage connected with the bore, and means for detaching the cage from the top; further embodiments include a plural drain tube connection-single bag filter and an enclosed cage model with an additional drain tube connection in the bottom for standpipe use.

4 Claims, 8 Drawing Figures

WASHING MACHINE DRAIN FILTER

This invention relates generally to materials separation and particularly to filters for washing machine drains.

Modern synthetic fabrics shed fibres during washing in the same manner as cotton or wool, but with the difference that they more strongly resist rot and dissolution by natural processes and by common drain cleaning chemicals. Many synthetic materials such as the polyesters ordinarily require exposure to sunlight to accelerate aging and thus are practically indestructible when lodged in the darkness of drainage and sewage systems.

Removal of synthetic fibre obstructions from domestic and from apartment sanitary systems almost always becomes a serious mechanical problem when laundry machines such as automatic washers are in frequent use. Even worse, septic tank drainfields must be abandoned or replaced entirely at great expense when clogged with synthetic fibres, which resist biological degradation even when finely divided.

Commercial laundry equipment and some domestic washing machines employ refuse separators to inhibit linting of the washload, but make little or no provision to prevent flushing separated solid material down the drain, in most cases actually backflushing to insure that such materials are drained away.

Numerous filters have been proposed for various applications, including those of the following exemplary U.S. Pat. Nos. 3,769,818 issued to R. R. Smith on November 7, 1973, disclosing a washer filter exhausting into a mesh bag with gravity drain into the washer; 1,762,224 issued to E. B. Cuthman et al on June 10, 1930, disclosing a gravity flow visible drain filter having detachable guard and filter element; and 1,551,947 issued to K. Hobbs on Apr. 20, 1926, disclosing a cage surrounding a mesh in a gravity drain filter.

However, of all the filters known to be in the prior art, none satisfies the objects of the present invention.

A principal object of this invention is to supply an efficient washing machine drain filter which provides high capacity, expansible high-volume flow, low rupture hazard and visible measure of filtrate in an easily emptied structure employing commonly available materials and adaptable to fit all washing machine drain lines.

Other objects are to provide a washing machine drain filter as described which in various embodiments receives plural drain exhausts into a common header and filter, and which can exhaust into standpipe systems.

Further objects are to provide a washing machine drain filter as described which is durable, easy to install and use, economical to manufacture, attractive in appearance, sanitary, and which is failsafe in operation.

In brief summary given for purposes of cursive description only, the invention in one embodiment comprises an openwork cage having a bottom, a detachable top with an upward hose-connection having a downward extension into the cage with a limp mesh bag substantially longer than the cage connected with the downward extension and resting on the bottom.

The above and other objects and advantages of the invention will become more readily apparent from the following description, including the drawings in which.

In the Figures, like reference numerals indicate like parts.

Figure 1:
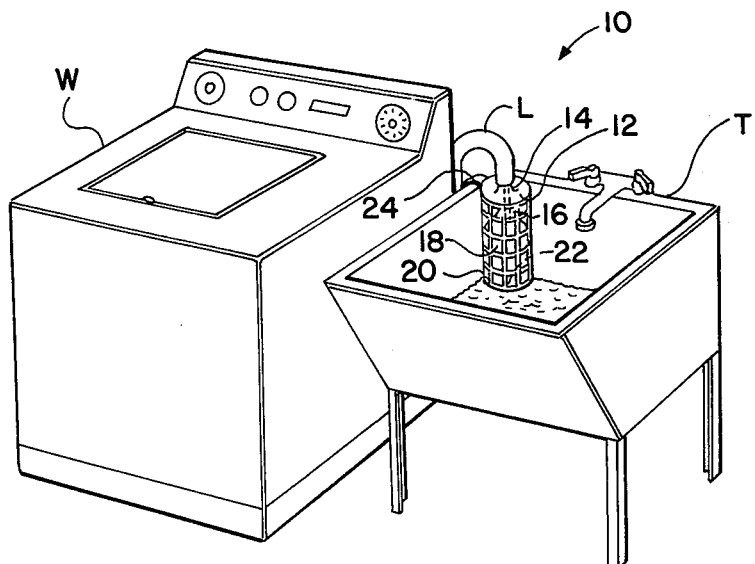
FIG. 1 is an isometric view of an embodiment of the invention connected in a washing machine drain system.

FIG. 1 shows the invention in a first filter-assembly embodiment 10 typically connecting the drain line L of a washing machine W with a tub T. The filter assembly includes a circular top 12 having a washing machine drain connection in the form of an upward hose connection 14 and a communicating downward extension 16 from the hose connection around which the mouth of a permeable limp mesh bag 18 such as a terminal length of sheer hosiery with one end closed is sealed. A disconnectable cage 20 having a bottom 22 depends from and forms an enclosure with the circular top, and the mesh bag, which is longer than the cage, and preferably greater in diameter, has a substantial portion of the length resting on the bottom of the cage. The cage bar spacing in the drawings is diagrammatic for exposition, but in practice is preferably much finer than shown, the perforations being nearly proximate.

A hook 24 on the upper part of the assembly detachably attaches it to the side of the tub.

Sheer hosiery, such as women's Nylon hosiery is chosen for ready availability, low cost (no cost if discarded), proper porosity, size adaptability, and resistance to laundry chemicals. Even though such hosiery is relatively weak, the present design accommodates for this, as will be seen.

In operation, the liquid drained from the washing machine forces the slack portion of the mesh bag, to expand to a height proportional to the flow and to the amount of fibrous matter previously collected in the unit.

Figure 2A:
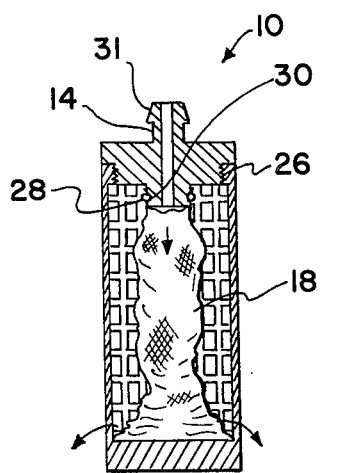
FIGS. 2a, 2b and 2c are elevational sectional diagrams of stages of use of the invention of FIG. 1.
Figure 2B:
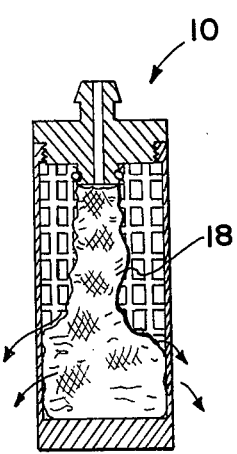
Figure 2C:
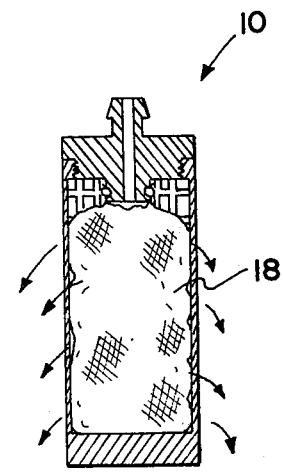

FIGS. 2a, 2b and 2c show in diagrammatical section how porosity of hosiery mesh, slack provided, and support by the cage are made such that surges in flow do not burst the mesh but instead progressively deploy more of the bag and fill the bag to a higher level, causing more filter area to come into play as needed to prevent high pressures and bursting, while preserving full flow. The bag fills with lint at the closed end first and as the lint ball increases in size the bag accomodates in a manner similar to that shown.

Convenience is also apparent in these three Figures in that the cage can be unscrewed at threads 26 from the top to open the enclosure for removal of collected matter and/or filter bag replacement. Filter bag mouths are preferably folded around the downward extension and secured by means of a rubber O ring 28 or the like which presses the filter material into a matching annular groove 30. Reverse flange 31 at the intake connection positively prevents washing machine rubber hose from slipping off the connection, and the overall design keeps surge pressures low.

Figure 3:
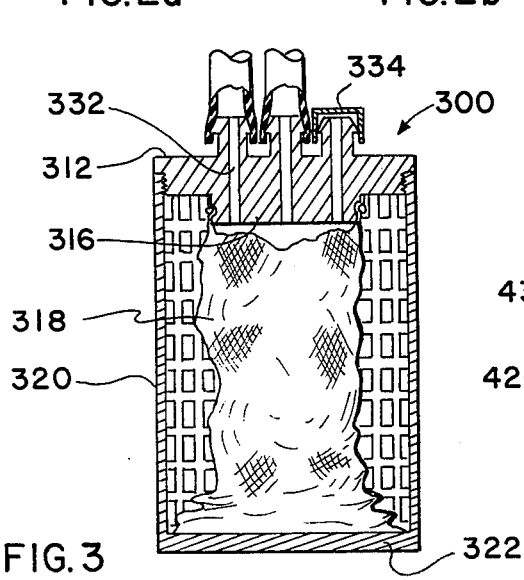
FIG. 3 is an elevation sectional view of another embodiment of the invention.

FIG. 3 shows an embodiment 300 of the invention having the top 312 in the form of a header, with plural drain connections and apertures 332 passing through it into a common downwardly extending portion 316 from which an over length and over diameter mesh bag 318 as before depends and extends to rest on the bottom 322 of the cage 320. Small apartments with a few machines can minimize maintenance by conveniently connecting all drains for collection of filtrate in a single mesh bag as shown. Unused drain connections can conveniently be closed off by a cap 334 or otherwise plugged, although in normal operation there is little or no back pressure.

Figure 4:
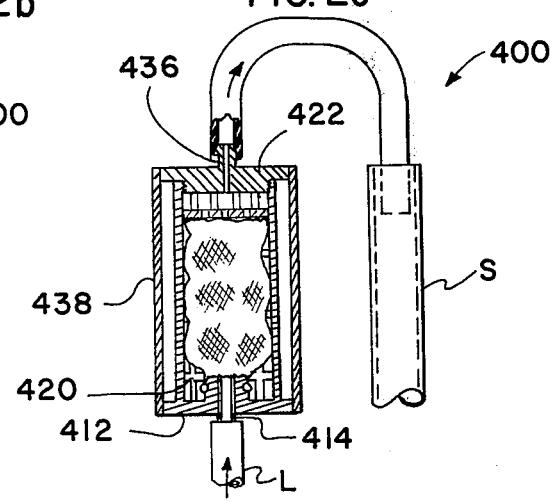
FIG. 4 is a side elevation section view of a further embodiment of the invention in a standpipe arrangement.

FIG. 4 shows a versatility of the invention in that it can be operated inverted in connection with a standpipe S. The embodiment 400 illustrated has a drain connection 436 in the bottom plate and a clear plastic cylinder 438 outside the cage 420 fitted to the top and bottom, 412, 422 which are oversize, with a space between cage and cylinder, permitting the mesh bag to deploy progressively in a lateral direction, supported by the cage and to collapse in the cage as before, without decreasing flow and decreasing pressure through contact between mesh bag and plastic cylinder. The cage has a perforate bottom.

In operation, the fibrous material separated by the mesh bag clings to it and rises and falls with it during surges and on and off operation.

It can be seen that filtration is substantially complete in any embodiment, operation is safe, quiet and cheap, without danger of clogging through failure of the mesh bag, since the cage is proportioned to contain any substantial mass of material collected regardless of whether the mesh bag is intact. The weight rests on the bottom of the cage, relieving load on the filter bag and fastening, and simplifying emptying procedure.

It can be seen further that there is good visibility of amount collected at all times, both through collapsed configuration of the mesh bag when not in operation and through height of flow when in operation, since material collected in the end of the mesh bag blocks flow in that portion, and flow in adjacent areas indicates the size of the collected mass.

Figure 5:
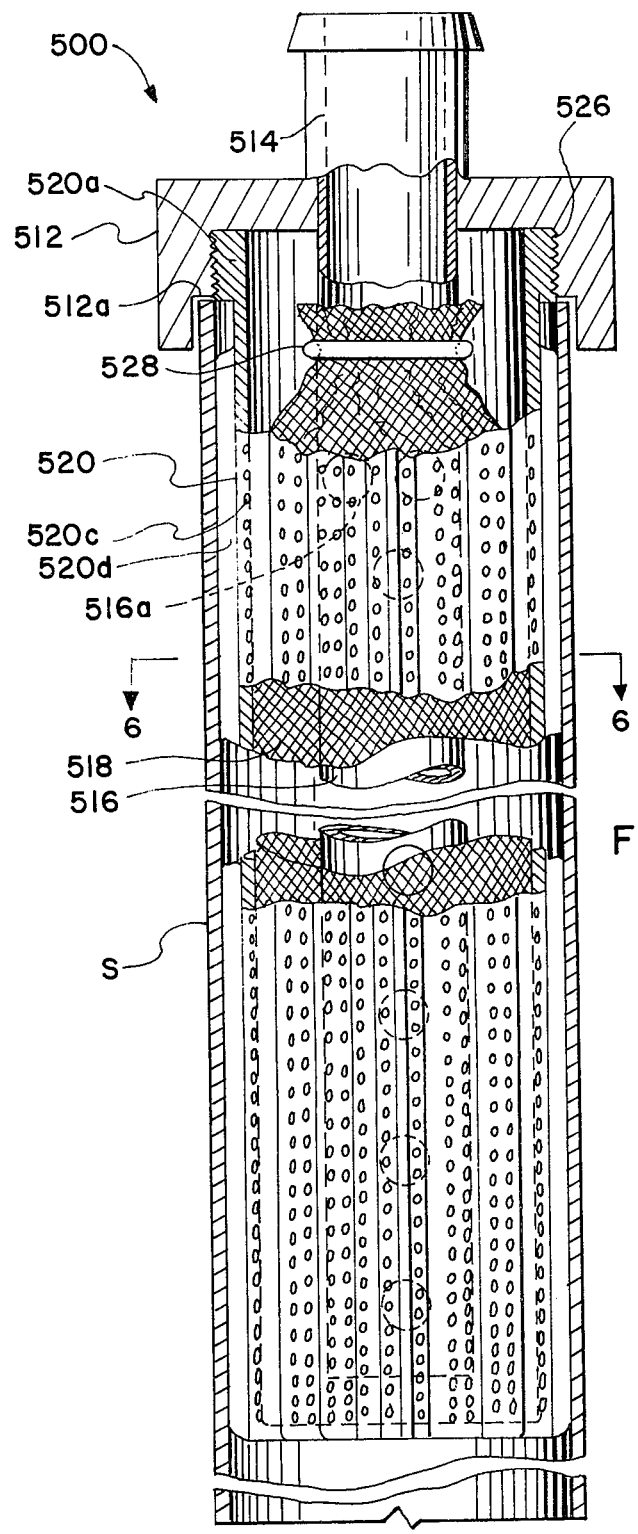
FIG. 5 is a partly sectional elevational view of still a further embodiment of the invention, taken at 5—5, FIG. 6.
Figure 6:
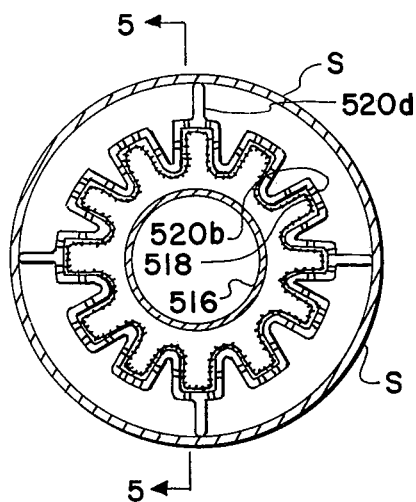
FIG. 6 is a sectional view taken at 6—6, FIG. 5.

FIGS. 5 and 6 illustrate a further embodiment 500 of the invention for use within a standpipe S, which may be a 2½ inch pipe-size standpipe. The invention may advantageously be about 26 inches long to provide optimum results for the diameter. Supporting the assembly on the standpipe is a circular top 512 having a circular recess 512a in the bottom receiving the top of the standpipe. The top has an upward hose connection 514 and a communicating downward extension from the hose connection in the form of a dip tube 516 having relatively large perforations 516a along the length, except for the first four inches approximately, and a closed bottom. The dip tube may be force-fitted, cemented, or formed integral with the top.

An elastic O ring 528 detachably affixes a mesh bag 518 to the upper portion of the dip tube in analogous manner to the first-described embodiment.

The top has screwthreads 526 coaxial with the dip tube and a cage 520 having a threaded upper end 520a attaches in the screwthreads. The cage is smaller in diameter and length than the mesh bag and shorter by an amount providing a flow clearance at the bottom, and has, preferably, corrugated cylindrical sidewalls 520b (FIG. 6) for exposing a greater area of the mesh bag. The cage perforations 520c should be relatively small and nearly proximate in spacing.

The cage has exterior longitudinal flowguides 520d which space it radially from the interior of the standpipe sufficiently to provide flow clearance along the length of the assembly.

In operation, water drains down the dip tube to the perforations, then laterally through the perforations into and through the mesh bag and down the standpipe.

The unit supports itself on the top of the standpipe loosely permitting venting, but even if bag replacement is neglected to the point of flow blockage by filtrate, water cannot spray laterally because of the top recess and the dip tube perforation location, but instead deflects downward.

Obviously, many modifications and variations of the present invention are possible in light of the above teachings. It is, therefore, to be understood that within the scope of the appended claims the invention may be practiced otherwise than as specifically described.

What is claimed and desired to be secured by United States Letters Patent is:

1. A filter for a washing machine, said filter comprising a circular enclosure with sidewalls, a closed bottom, an open top, said sidewalls being perforate as means for permitting the flow of fluid therethrough and for permitting visibility into the interior of said circular enclosure, removable means for closing said open top of the circular enclosure, structure defining an inlet opening through the means for closing, a downward extension of said means for closing circumferentially spaced within said circular enclosure and having communication with said inlet opening, a flexible filter bag having an open upper end, said downward extension having means for removably retaining and sealing the open upper end of the flexible filter bag against the outer peripheral surface of the downward extension, said flexible filter bag having a diameter at least equal to the internal diameter of the circular enclosure and having a length at least sufficient so that the bottom end of the flexible filter bag is supported by the closed bottom of said circular enclosure.

2. A filter as recited in claim 1, wherein the flexible filter bag comprises a mesh bag such as a terminal length of women's sheer hosiery.

3. A filter as recited in claim 2, wherein the means for removably retaining and sealing the mouth of the flexible filter bag includes structure defining an annular groove around the exterior periphery of the downward extension and an elastic O ring retaining the open upper end of the flexible filter bag in the annular groove.

4. A filter as recited in claim 1, wherein the means for closing the open top has a plurality of identical said inlet openings therein, said flexible filter bag being in communication with all said inlet openings.

* * * * *